United States Patent
Nurmi et al.

(10) Patent No.: US 9,933,914 B2
(45) Date of Patent: Apr. 3, 2018

(54) METHOD AND APPARATUS OF ASSOCIATING APPLICATION STATE INFORMATION WITH CONTENT AND ACTIONS

(75) Inventors: Mikko Antero Nurmi, Tampere (FI); Oleg Kozitsyn, Tampere (FI)

(73) Assignee: Nokia Technologies Oy, Espoo (FI)

( * ) Notice: Subject to any disclaimer, the term of this patent is extended or adjusted under 35 U.S.C. 154(b) by 2313 days.

(21) Appl. No.: 12/497,977

(22) Filed: Jul. 6, 2009

(65) Prior Publication Data

US 2011/0004851 A1    Jan. 6, 2011

(51) Int. Cl.
| | | |
|---|---|---|
| G06F 3/048 | (2013.01) | |
| G06F 3/0481 | (2013.01) | |
| G06F 3/0486 | (2013.01) | |
| G06F 3/0484 | (2013.01) | |
| G06F 3/0488 | (2013.01) | |

(52) U.S. Cl.
CPC ........ G06F 3/04817 (2013.01); G06F 3/0486 (2013.01); G06F 3/04845 (2013.01); G06F 3/04883 (2013.01)

(58) Field of Classification Search
CPC ............. G06F 3/04883; G06F 3/04817; G06F 3/0486; G06F 3/04845
USPC ....................................................... 715/853
See application file for complete search history.

(56) References Cited

U.S. PATENT DOCUMENTS

| | | |
|---|---|---|
| 5,226,117 A | 7/1993 | Miklos |
| 5,481,722 A | 1/1996 | Skinner |
| 5,623,656 A | 4/1997 | Lyons |
| 5,805,159 A * | 9/1998 | Bertram ................ G06F 3/0237 345/169 |
| 5,812,773 A | 9/1998 | Norin |
| 5,835,091 A | 11/1998 | Bailey et al. |
| 5,835,712 A | 11/1998 | Dufresne |
| 6,417,874 B2 | 7/2002 | Bodnar |
| 6,526,285 B1 | 2/2003 | Matsumoto et al. |
| 6,781,611 B1 | 8/2004 | Richard |
| 8,209,622 B2 | 6/2012 | Selig |
| 2002/0113778 A1 | 8/2002 | Rekimoto et al. |
| 2003/0058277 A1 | 3/2003 | Bowman-Amuah |
| 2003/0144868 A1 | 7/2003 | MacIntyre et al. |

(Continued)

FOREIGN PATENT DOCUMENTS

| | | |
|---|---|---|
| EP | 0 369 961 A2 | 5/1990 |
| EP | 1 566 954 A2 | 8/2005 |

(Continued)

OTHER PUBLICATIONS

International search report and written opinion for corresponding international application No. PCT/FI2010/050536 dated Oct. 27, 2010, pp. 1-13.

(Continued)

*Primary Examiner* — Patrick F Riegler
(74) *Attorney, Agent, or Firm* — Ditthavong & Steiner, P.C.

(57) ABSTRACT

An approach is provided for associating applications, such as widgets, with content and actions. The approach specifies a hierarchy of content and/or actions to be presented and/or executed by a first widget based on state information of a second widget. This hierarchy is stored in an association framework for retrieval by active widgets.

20 Claims, 16 Drawing Sheets

(56) References Cited

U.S. PATENT DOCUMENTS

| | | |
|---|---|---|
| 2003/0222912 A1* | 12/2003 | Fairweather .......... G06F 9/4436 715/763 |
| 2004/0221260 A1 | 11/2004 | Martin et al. |
| 2004/0237050 A1 | 11/2004 | Anderson |
| 2005/0066286 A1 | 3/2005 | Makela |
| 2005/0138033 A1 | 6/2005 | Katta et al. |
| 2005/0210399 A1 | 9/2005 | Filner et al. |
| 2006/0005114 A1 | 1/2006 | Williamson et al. |
| 2006/0005207 A1 | 1/2006 | Lough et al. |
| 2006/0010394 A1 | 1/2006 | Chaudhri et al. |
| 2006/0015818 A1 | 1/2006 | Chaudhri et al. |
| 2006/0107205 A1 | 5/2006 | Makela |
| 2006/0150118 A1 | 7/2006 | Chaudhri et al. |
| 2006/0156248 A1 | 7/2006 | Chaudhri et al. |
| 2006/0156250 A1 | 7/2006 | Chaudhri et al. |
| 2006/0206835 A1 | 9/2006 | Chaudhri et al. |
| 2006/0282758 A1 | 12/2006 | Simons et al. |
| 2007/0016873 A1 | 1/2007 | Lindsay |
| 2007/0038934 A1 | 2/2007 | Fellman |
| 2007/0075136 A1 | 4/2007 | Jacob |
| 2007/0101291 A1* | 5/2007 | Forstall et al. .............. 715/805 |
| 2007/0112714 A1* | 5/2007 | Fairweather ............ G06F 8/427 706/46 |
| 2007/0266093 A1 | 11/2007 | Forstall et al. |
| 2008/0137271 A1 | 6/2008 | Saila |
| 2008/0141141 A1 | 6/2008 | Moore et al. |
| 2008/0141153 A1 | 6/2008 | Samson et al. |
| 2008/0144860 A1 | 6/2008 | Haller et al. |
| 2008/0163187 A1 | 7/2008 | Loff |
| 2008/0184148 A1 | 7/2008 | Selig |
| 2008/0307334 A1 | 12/2008 | Chaudhri et al. |
| 2009/0044144 A1 | 2/2009 | Morris |
| 2009/0049384 A1* | 2/2009 | Yau .................... G06F 3/04817 715/716 |
| 2009/0089704 A1 | 4/2009 | Makela |
| 2009/0125835 A1 | 5/2009 | Vanghan et al. |
| 2010/0077328 A1* | 3/2010 | Berg .................... G06F 3/0481 715/764 |
| 2010/0095248 A1* | 4/2010 | Karstens ................ G06F 3/048 715/846 |
| 2010/0138763 A1* | 6/2010 | Kim ...................... G06F 1/1626 715/765 |
| 2010/0255882 A1* | 10/2010 | Kozitsyn et al. ............. 455/566 |
| 2010/0269069 A1* | 10/2010 | Paila ................... G06F 3/04817 715/835 |
| 2011/0134804 A1* | 6/2011 | Maes .................. H04M 7/0012 370/259 |
| 2017/0052675 A1* | 2/2017 | Paila ................... G06F 3/04817 |

FOREIGN PATENT DOCUMENTS

| | | |
|---|---|---|
| KR | 10-0861659 B1 | 10/2008 |
| WO | WO 99/28813 | 6/1999 |
| WO | WO 02/50657 A1 | 6/2002 |
| WO | WO 02/075523 A1 | 9/2002 |
| WO | WO 02/089010 A1 | 11/2002 |
| WO | WO 03/077552 A1 | 9/2003 |
| WO | WO 2005/002272 A1 | 1/2005 |
| WO | WO 2006/012168 A2 | 2/2006 |
| WO | WO 2006/012343 A2 | 2/2006 |

OTHER PUBLICATIONS

Office Action for related U.S. Appl. No. 12/425,904 dated Nov. 10, 2011, pp. 1-22.

Office Action for related U.S. Appl. No. 12/425,904 dated Oct. 25, 2012, pp. 1-22.

* cited by examiner

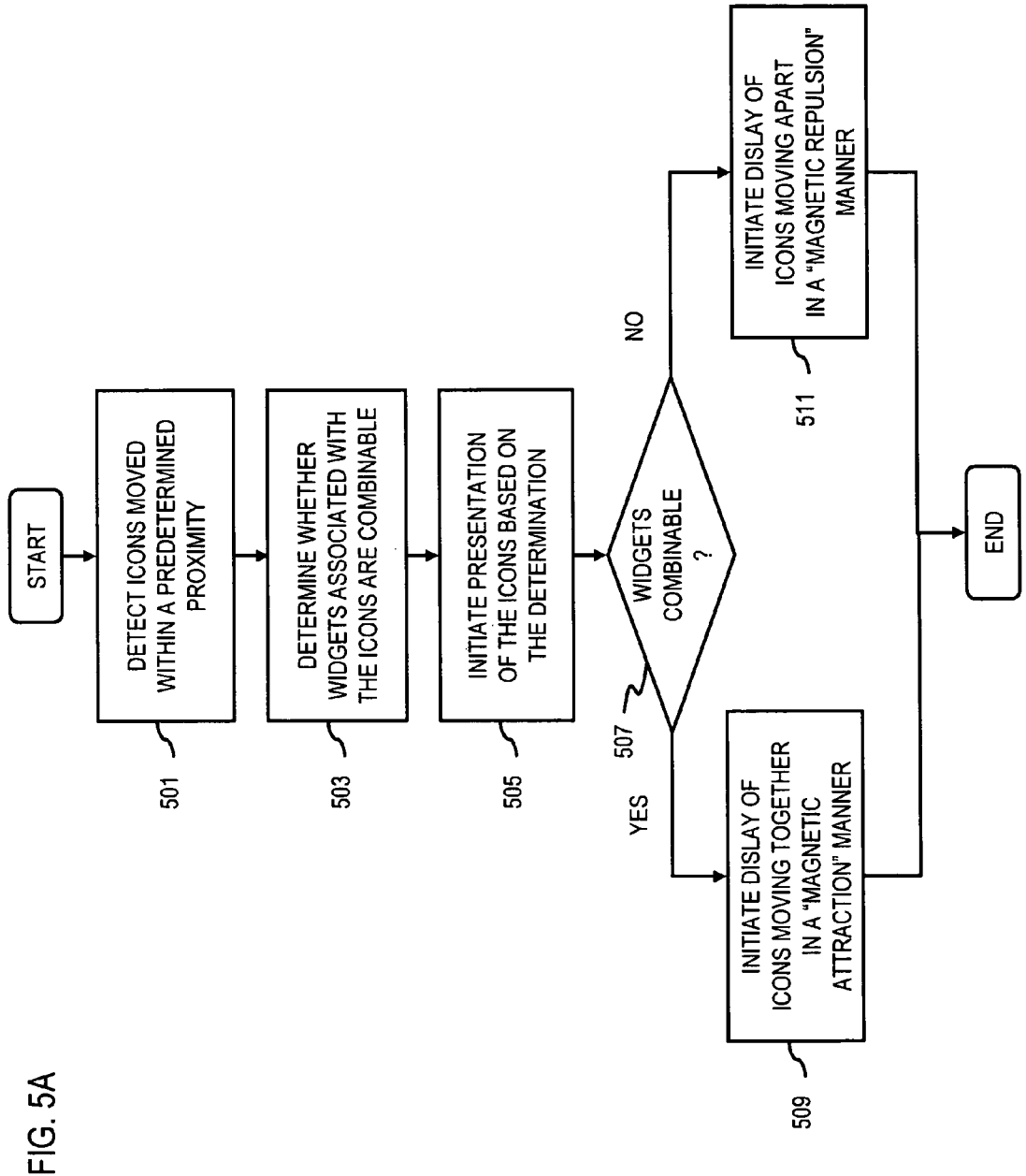

METHOD AND APPARATUS OF ASSOCIATING APPLICATION STATE INFORMATION WITH CONTENT AND ACTIONS

BACKGROUND

Wireless (e.g., cellular) service providers and device manufacturers are continually challenged to deliver value and convenience to consumers by, for example, providing compelling network services, applications, and content, as well as user-friendly devices. An important differentiator in this industry is the user interface. In particular, light-weight applications also widely known as widgets have emerged as a convenient means for presenting information and accessing services. These widgets provide basic components of graphical user interfaces (GUIs) for users to interact with applications, and enable more robust and user-friendly controls for user devices.

SOME EXAMPLE EMBODIMENTS

According to one embodiment, a method comprises specifying a hierarchy of content, actions, or both to be presented by a first application based on state information of a second application. The method also comprises storing the hierarchy in an association framework.

According to another embodiment, an apparatus comprises at least one processor, and at least one memory including computer program code. The at least one memory and the computer program code is configured to, with the at least one processor, cause the apparatus to specify a hierarchy of content, actions, or both to be presented by a first application based on state information of a second application. The apparatus is also caused to store the hierarchy in an association framework.

According to another embodiment, a computer-readable medium carries one or more sequences of one or more instructions which, when executed by one or more processors, cause an apparatus to specify a hierarchy of content, actions, or both to be presented by a first application based on state information of a second application. The apparatus is also caused to store the hierarchy in an association framework.

According to yet another embodiment, an apparatus comprises means for specifying a hierarchy of content, actions, or both to be presented by a first application based on state information of a second application. The apparatus also comprises means for storing the hierarchy in an association framework.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 5A and 5B are, respectively, a flowchart of a process for displaying the association of applications, and a diagram of a visual presentation of the association, according to various embodiments;

DESCRIPTION OF SOME EMBODIMENTS

A method and apparatus for associating applications, such as widgets, and providing context information, such as state information, and/or content information among the applications are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to widgets, it is contemplated that the approach described herein may be used with other applications.

Figure 1:
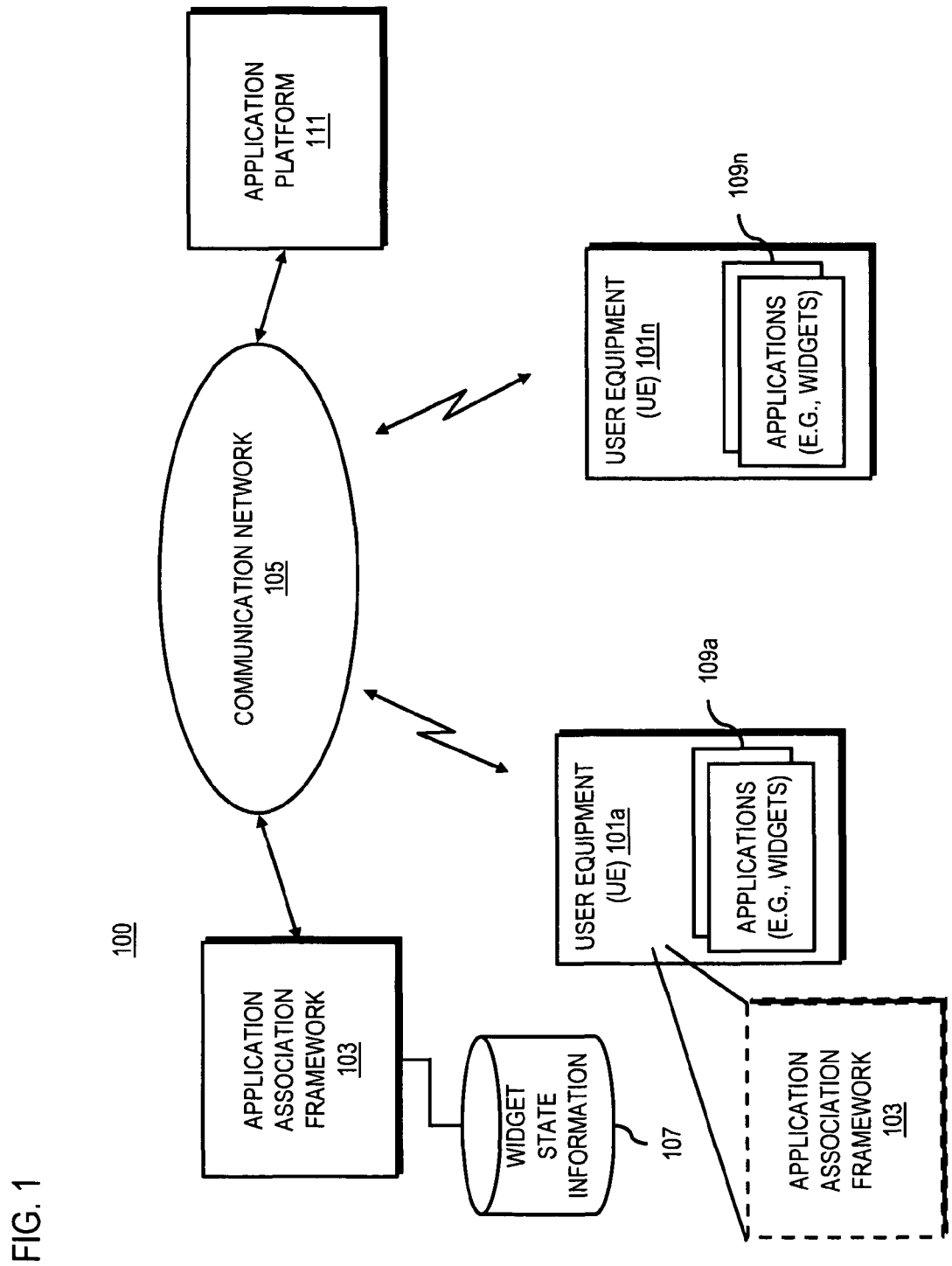
FIG. 1 is a diagram of a system capable of providing state information among applications, e.g. widgets, according to one embodiment.

FIG. 1 is a diagram of a system capable of providing state information among applications, e.g. widgets, according to one embodiment. System 100 provides management of widgets, whereby state information of these widgets is maintained. In addition, the widgets can be manipulated using a user interface that permits simultaneous selection of such widgets for invoking a common action, for example. The widgets can be represented as icon-like active mini-views of services; both referred to as "icons" hereinafter.

As shown in FIG. 1, system 100 comprises one or more user equipment (UEs), e.g., UEs 101a-101n, having connectivity to an application association framework 103 via a communication network 105. The UEs 101a-101n are any type of mobile terminal, fixed terminal, or portable terminal including mobile handsets, mobile phones, mobile communication devices, stations, units, devices, multimedia tablets, digital book readers, game devices, audio/video players, digital cameras/camcorders, positioning device, televisions, radio broadcasting receivers, Internet nodes, communicators, desktop computers, laptop computers, Personal Digital Assistants (PDAs), or any combination thereof. Under this scenario, the UE 101a employs a radio link to access the communication network 105, while connectivity of UE 101n to the network 105 can be provided over a wired link. It is also contemplated that the UEs 101a-101n can support any type of interface to the user (such as "wearable" circuitry, etc.).

The association framework 103 stores, for instance, state information within a database 107 for the applications 109a-109n resident respectively on the UEs 101a-101n. In one embodiment, such state information can be rich state information. For example, via the association framework 103, widget 109a can use the rich state information of another widget, e.g., widget 109b, to modify its own state and properties. It is also contemplated that the association framework 103 can store information describing linkages between the state of a first widget 109a and the content or actions that are to be presented and/or executed by one or more other widgets 109b-109n. More specifically, these linkages indicate the content or actions to be presented and/or executed by widgets 109b-109n given a particular state of the first widget 109a. Although shown as a standalone component, it is contemplated that the association framework 103 along with the database (or memory) 107 can be deployed within the user equipment (e.g., as shown within UE 101a), an application platform 111, or any other component of the system 100.

According to one embodiment, the applications, e.g. widgets, 109a-109n can be supplied and/or operate in conjunction with the application platform 111. For example, the widgets 109a-109n can be downloaded at the request of the user, or alternatively, be delivered based on a service operated by a service provider. By way of illustration, the widgets 109a-109n are authored so that they use the association framework 103 to report their own status as well as query other widgets' status information. Depending on the deployment, widget 109a may periodically access association framework 103 to learn about changes to the status of widget 109b. A widget can thus be regarded as a user interface element, and can be downloadable and support software that provides a variety of content information, e.g., news, stock quotes, weather forecasts, maps, location information, advertisement, calendars, calendar information, contact information, messages, emails, service guide information, recommendations, audio files, video files, radio/television broadcasting, etc. A widget may be configured to continuously receive content information, such as continuously updated content, from one or more sources.

By way of example, widgets 109a, which are denoted widget icon A (or simply widget A) and widget B, are displayed on the UE 101a. Widget A is moved next to widget B, causing widget A to update its location on the display and status/content information to, e.g., the association framework 103. The association framework 103 determines location of widget A in relation to other widgets, whereby widget B is found to be next to widget A. Further, the association framework 103 sends update of status/content information of widget A to widget B, which updates its activity/information based on the received update. Also, widget B can request update from the association framework 103; this framework 103 sends update of status/content information of widget A to widget B. Subsequently, widget B updates its activity/information based on the received update. In certain embodiments, updating of the status/content of Widget A need not be triggered by movement of Widget A. Instead, a user can select Widget B to place it in an active state by, for instance, tapping Widget B on a touchscreen or by selecting Widget B by a mouse, cursor, or the like. The active state of Widget B then triggers Widget A to updates its status/content accordingly.

Furthermore, one or more of the UEs 101a-101n, in certain embodiments, can utilize an input mechanism (e.g., touch screen, mouse, cursor controls, keys, etc.) that permits manipulation of their respective widgets 109a-109n. In one embodiment, the input mechanism is a touch screen user interface, e.g., a multi-touch screen, to permit a user to simultaneously, concurrently, and/or sequentially select different widgets for associating them. Widgets 109a-109n may be arranged and displayed on a dashboard that is located in a predetermined area within a graphical user interface (GUI) or display. The user equipment 101a can visually display, for instance, two widgets moving towards each other analogous to two magnets that are attracted. Thus, the user can discern that the selected widgets can be combined (e.g., share a common action) because of the magnetic attraction—i.e., movement in a magnetic attraction manner. Moreover, the user can be notified that the widgets cannot be combined, when the widgets repel, whereby the movement of the widgets resemble that of two magnets repelling. In one embodiment, the ability to be combined can be specified as part of the state information stored within the widget state information database 107.

According to certain embodiments, widgets 109a-109n may comprise one or more components that define data type or the like for the different data components that are included. These widgets 109a-109n may be labeled with "+" and "−" indications or the like or the identity to notify the user which one is attractive and which one is repulsive (i.e., their magnetic properties). Such indications can change depending on neighboring widgets and/or data components of those widgets. These data components can have the properties that can individually communicate with the other respective components in other widgets. One example is "update" of this particular data component. In this way, this updated component data can be shared with other widgets. For example, the data components may include a clock functionality, whereby this clock functionality of one widget can be provided to other widget when these widgets are positioned close to one another widget that does not have (but can accommodate) this feature. In other words, the widget can be placed in a mode where it attracts a clock functionality that is to be included as one data component when these two widgets are moved close enough. The data components may possess properties that indicate different level, or degrees, of attraction or repulsion (e.g., 40% minus or 60% plus).

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), the Internet, or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, mobile ad-hoc network (MANET), and the like. In addition, the wireless network may be, for example, a short range network, such a Bluetooth® network, ultra wide band (UWB) network, radio frequency identification (RFID) network or infrared network (IrDA).

By way of example, the UEs 101a-101n communicate with the application association framework 103 over the communication network 105 using standard protocols. The UEs 101a-10n and the association framework 103 are network nodes with respect to the communication network 105. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are effected, for example, by exchanging discrete packets of data. Each packet comprises, for example, (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol indicates, for example, a type for the next protocol contained in its payload. The higher layer protocol is said to be encapsulated in the lower layer protocol. The headers included in a packet traversing multiple heterogeneous networks, such as the Internet, include, for example, a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
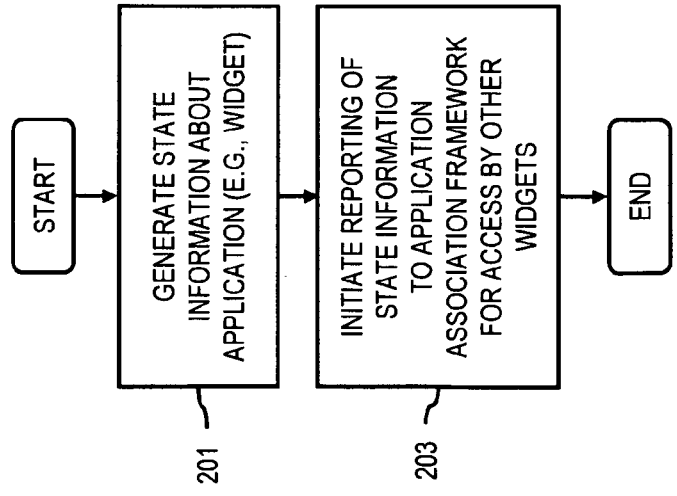
FIG. 2 is a flowchart of a process for reporting state information to an association framework, according to one embodiment.

FIG. 2 is a flowchart of a process for reporting state information to an association framework, according to one embodiment. By way of example, this process is described with respect to the applications 109a within user equipment 101a and enables update of settings and content of the applications 109a. In step 201, state information about a particular one of the applications (e.g., widget 109a) is generated. Such state information is then reported to the association framework 103 over the communication network 105, per step 203. The state information is stored in the database 107 by the association framework 103 for access by other applications 109a of UE 101a.

As mentioned, the association framework 103 facilitates the exchange of state information among widgets executed within a particular user equipment; however, it is contemplated that such exchange can occur among widgets within separate user equipment.

Figure 3:
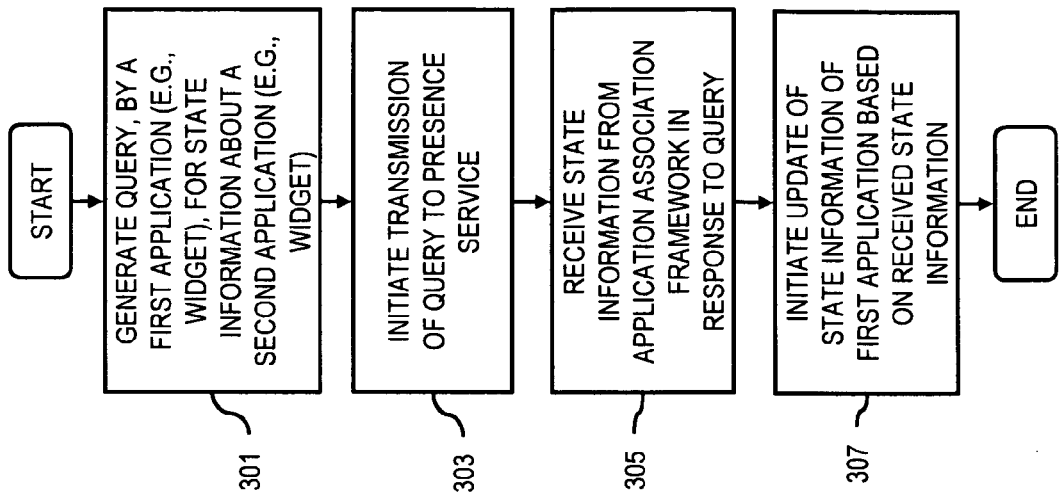
FIG. 3 is a flowchart of a process for sharing state information among applications, according to one embodiment.

FIG. 3 is a flowchart of a process for sharing state information among applications, according to one embodiment. Continuing with the example of FIG. 2, widget A generates a query for state information about widget B, as in step 301. In step 303, transmission of the query is initiated by the process to the association framework 103. Thereafter, the UE 101a transmits the query over the network 105 to the association framework 103, which retrieves the appropriate state information and generates a response specifying the retrieved information. The response is then forwarded to the requesting widget A. In step 305, state information is received by widget A from the association framework 103; widget A initiates, per step 307, update of its own state information based on the received state information of widget B.

Based on the above process, a widget can be considered either as a reactive widget or an active widget. In a reactive mode of operation, widget A can periodically access association framework 103 (or waits to be notified by association framework 103) to query state of a particular widget or type of widget, on a specific system or a number of systems (for example widget-type@user@domain, or widgetA@user@domain). The query can specify parameter(s) relating to information sought by the widget about other one or more widgets, such as widget B. Accordingly, the response by the association framework 103 can contain the result parameters as available in the association framework 103 for the queried widget(s). Based on the response, the widget A updates itself according to, for instance, a certain application logic. The state change may, in addition to or in the alternative, trigger initiating widget to update its status on association framework 103 along with one or more state parameters.

Another mode of operation is that of "active." In this case, upon user interaction, for example movement of one or more widget icons, selection of a widget icon, change of a widget's state, the state of the other widget(s) can change accordingly. In one embodiment, application logic state associated with the widget can specify whether the widget is active or inactive, placement of the widget on the UI, widgets (or widget types) neighboring the widget on the user screen, widget location on the UI, widget shortcut menu placement, input the widget last had, keywords of current widget content, current widget content identification, current widget status information, current widget context information, etc. Any set of that information can be communicated to association framework 103, which in turn records the communicated data in database 107 as any attribute-value pair, where value can be scalar value or any matrix. After, during, or even before the state communication the active widget can act as reactive widget and run the procedure for reactive operation.

As a further illustration, users, X and Y, utilize widgets A and B, respectively. In this example, user X has located widget A of a certain type next to a TV channel widget, while user Y has located widget B of another type next to the TV channel widget. The TV channel widget is active, and polls its source for content, when displaying advertisements. The source can be association framework 103 in which case the TV channel widget directly requests presence information. In an alternative embodiment, the source can be a proxy service that further consults association framework 103. The TV widget can issue a direct or indirect query to the source (or association framework 103) to request the following information: types and quantity of the neighboring widgets. Based on the received information, the TV widget (or source) may determine the appropriate ad to be displayed on the TV channel widget.

According to certain embodiments, the described processes leverage the association framework 103 as a platform for inter-widget communication, either directly or indirectly. Further, the use of widget typing removes the need to know exactly the identifier of the widget that is the subject of the query. This, thus, minimizes overhead.

Furthermore, the association framework 103 can support the ability to associate widgets in a manner that visually alerts the user of whether such association (e.g., sharing of information, execution of a common action, etc.) is permissible. In one aspect, a common command or action can be applied to group of selected widgets. In another aspect, two widgets can be combined or associated with each other in a way that is intuitive to the user. These capabilities are further detailed below with respect to FIGS. 4-8.

Figure 4:
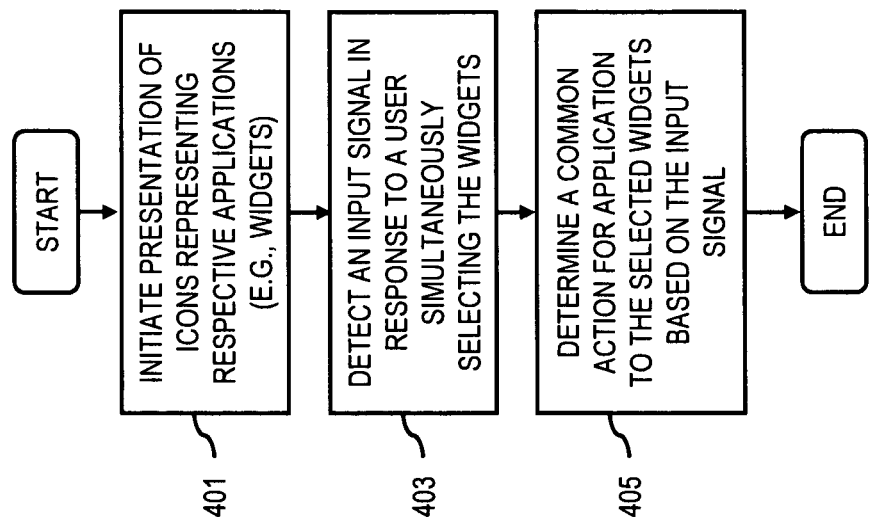
FIG. 4 is a flowchart of a process for associating applications, according to one embodiment.

FIG. 4 is a flowchart of a process for associating applications, according to one embodiment. For the purposes of illustration, this process is explained with respect to one or more relating applications or widgets with each other in the user interface (UI) environment. As shown, in step 401, the process initiates presentation of icons representing respective applications, e.g. widgets. An input signal is detected in response to a user simultaneously, concurrently, and/or sequentially selecting the one or more widgets, per step 403. Next, the process determines, as in step 405, a common action for application to the selected widgets based on the input signal. Moreover, the widgets can stick together for a certain period of time to indicate that a certain defined action (e.g., update) is in execution; and when complete, the widgets can be separated, remain next to each other, or return to their original location(s).

Figure 5B:
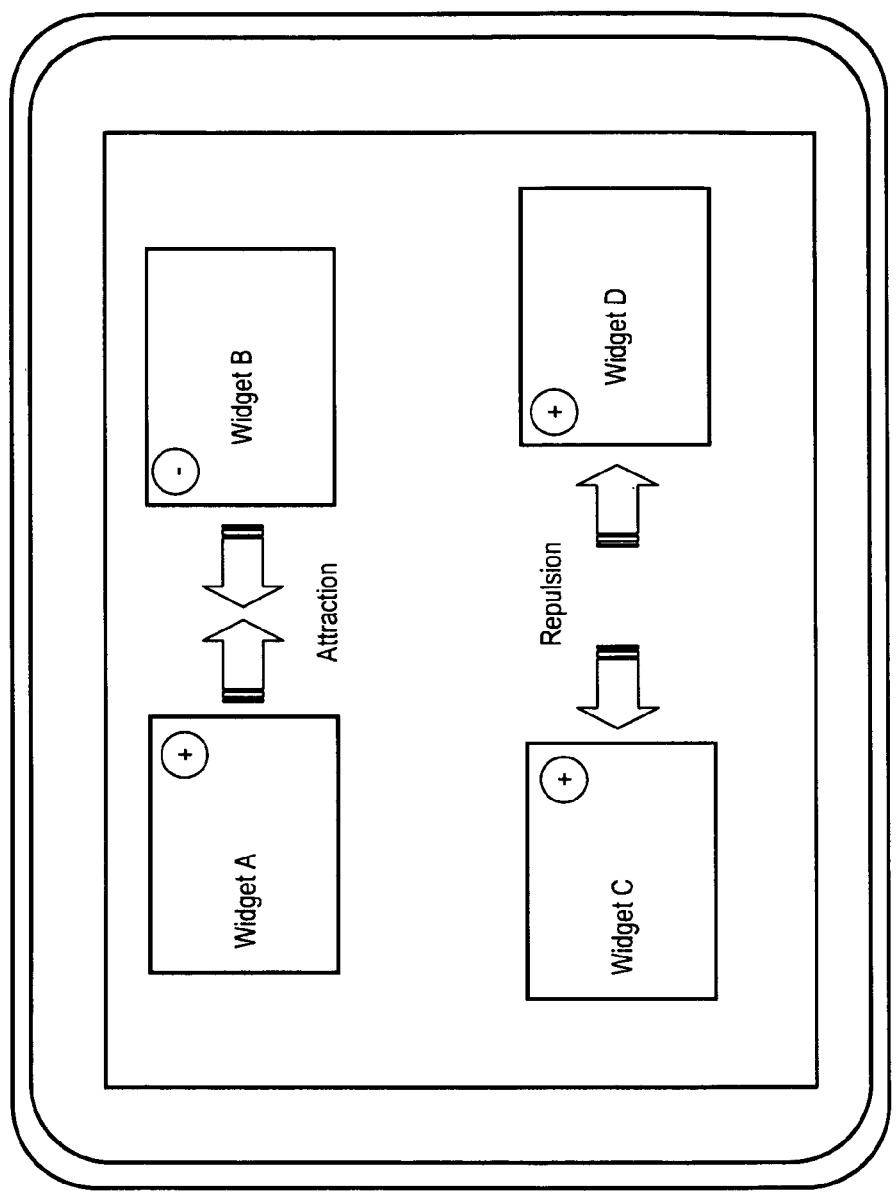

FIGS. 5A and 5B are, respectively, a flowchart of a process for displaying the association of applications, and a diagram of a visual presentation of the association, according to various embodiments. As seen in FIG. 5A, in step 501, the process detects icons corresponding to widgets 109a being moved within a predetermined proximity, or made to partially overlap. Next, it is determined whether the subject widgets 109a can be associated, per step 503. In step 505, the process initiates presentation of the icons based on the determination. This determination can be made based on state information obtained from association framework 103, as previously described; namely, the state information can include a field specifying how and what information can be combined with other widgets. According to certain embodiments, widgets 109a may have a general level of the Application Programming Interface (API) classes or types, wherein at least one or more API classes or types affect and controlled by device drivers control. In this manner, the widget of certain API classes or types can either accept cooperation or deny cooperation. In one embodiment, the API may refer to simple mail transfer protocol (SMTP).

In step 507, the process determines whether the widgets are combinable. If the widgets are combinable (e.g., capable of cooperation), the process initiates display of the icons moving together in a "magnetic attraction" manner (step 509). As mentioned, the widgets A-D may include data components that specify their magnetic property or polarity (e.g., "+" or "−") with respect to the particular action. The selected widgets would be drawn together, such as widgets A and B shown in a display 550 of FIG. 5B. For example, assuming the display 550 supports a touch interface, when the user attempts to associate widgets A and B by dragging the widgets towards a common midpoint, these widgets will "snap" together. However, if the widgets cannot be combined, the display 550 shows the icons of the widgets, e.g. widgets C and D, as repelling away from each other in a "magnetic repulsion" manner (step 511).

In one use case, a user of UE 101a installs widget A into a widget framework. The user then inputs information X to the installed widget A, and moves the widget location on screen or display of UE 101a next to a previously installed widget B. The following two actions can be performed based on the information that user has previously installed widgets A and B (assuming widget B has input X and widgets A and B are located next to each other). In the first case, the user enters widget discovery service and is presented widget C. The decision to display widget C can be based on the inter-widget state knowledge. As for the second case, widget B is refreshed with new content. For example, widget B is TV guide widget and widget A is of type video widget—or some specific video widget—displaying TV channel, and the update is for widget B to show the TV guide listing for the channel that widget A represents. As shown, the combinability of these widgets can be indicated by the magnetic movement.

Figure 6:
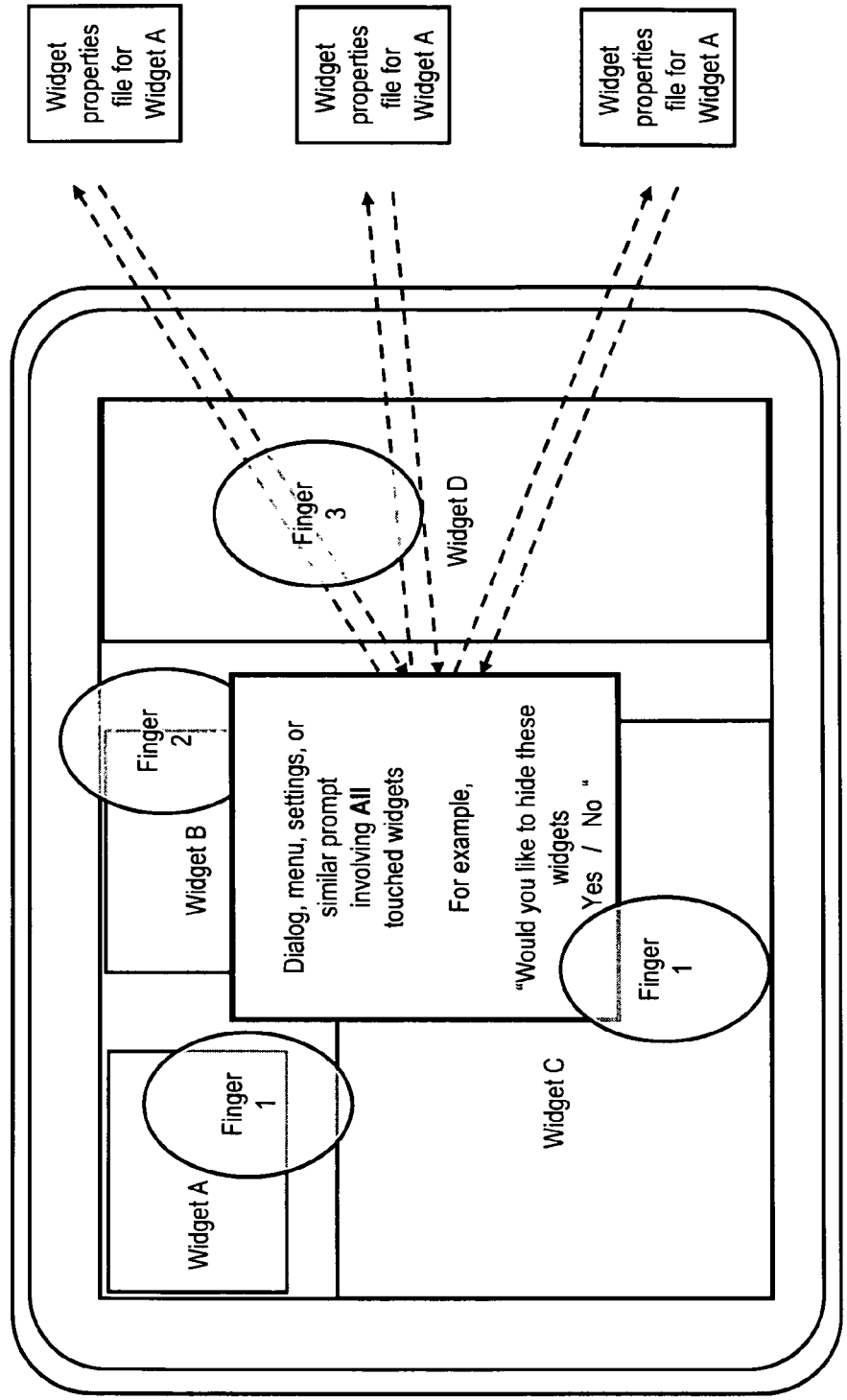
FIGS. 6-8 are diagrams of a multi-touch user interface for associating widgets, according to various embodiments.
Figure 7:
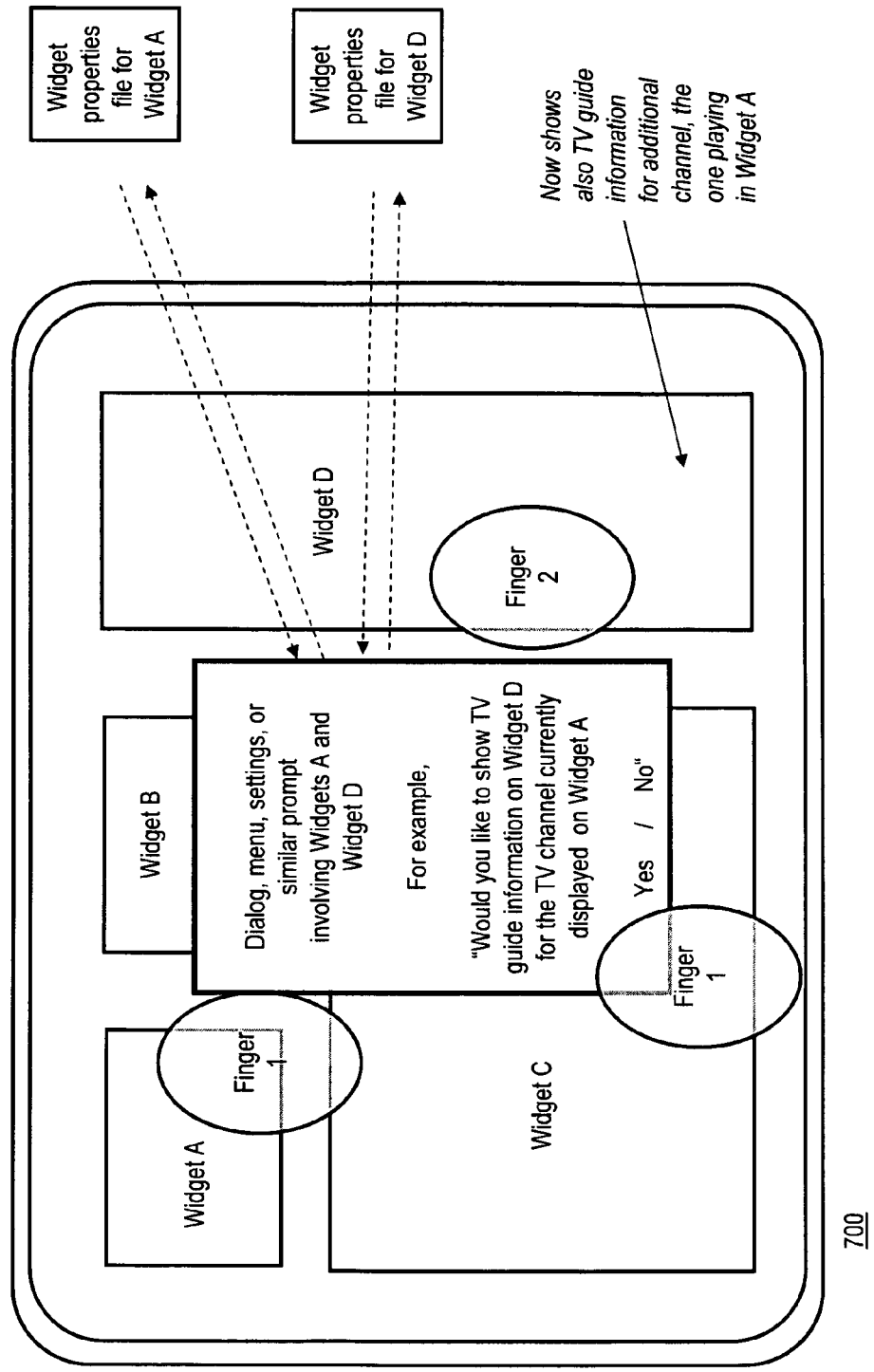
Figure 8:
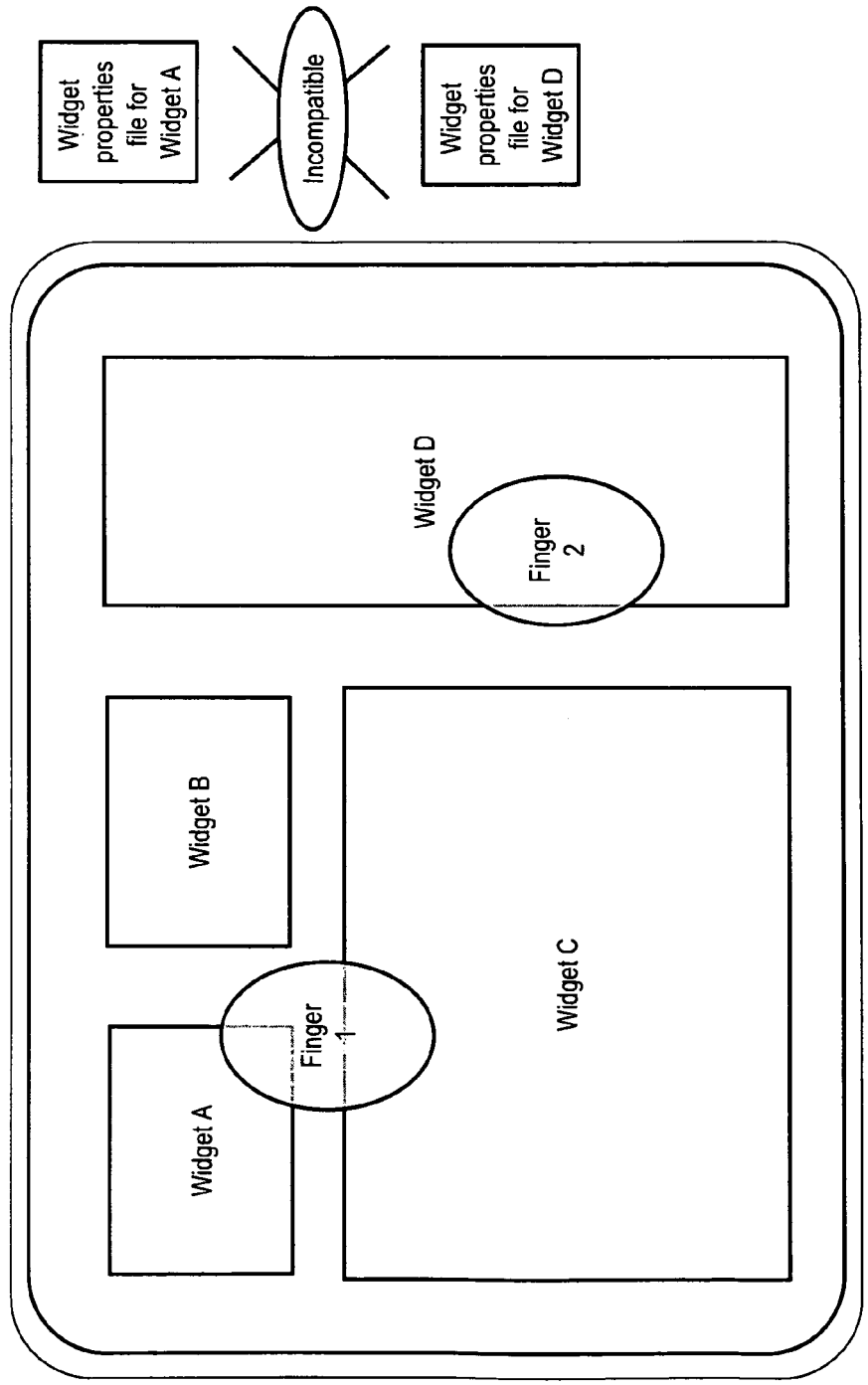

FIGS. 6-8 are diagrams of a multi-touch user interface for associating widgets, according to various embodiments. For the purposes of illustration the interface of FIGS. 6-8 is that of a multi-touch display. However, it is contemplated that other user input mechanisms can be utilized to permit concurrent selection of icons associated with the applications, e.g. widgets. In the example of FIG. 6, interface 600 illustrates such a scenario involving simultaneous selection of the widgets through the touch input, as indicated by Fingers 1, 2, and 3, to apply a common command or action. Initially, widget A is selected using Finger 1, thereby invoking widget properties for widget A. Next, the user can simultaneously select widgets B, C, and D using Fingers 1, 2, and 3. Such selection can cause a text box to appear that ties the selected widgets B, C, and D to an action defined as part of widget A. For instance, the text prompt "Would you like to hide these widgets Yes/No" (which is associated with widget A) can be presented to the user to take action for widgets B, C, and D. If the user provides an input of "Yes," then widgets B, C, and D would be hidden (e.g., as a background process).

The example of FIG. 7 pertains to an attempt by the user (in interface 700) to associate two widgets, widget A and widget D. Under this scenario, widget A is presenting a particular TV channel, and widget D provides TV guide information. The user uses Finger 1 and Finger 2 to select widgets A and D and moves the widgets A and D together. Although not illustrated, a successful association can be visually presented when widget A and widget D attracts. After the display of magnetic-like attraction, widgets A and D can resume their respective positions. As shown, a text prompt, "Would you like to show TV guide information on Widget D for the TV channel currently displayed on Widget a Yes/No." Here, the user selects Yes (using Finger 1), and thus, widget D now is updated to show TV guide information for the channel being played on widget A. The determination of whether the association is possible can be based on state information provided by association framework 103, as earlier described.

FIG. 8 shows an interface 800 involving a situation in which the selected widgets are not combinable. As before, the user can select widget A and widget D using Finger 1 and Finger 2 to attempt to bring the widgets together. However, the interface 800 can indicate that the selected widgets cannot be combined by the widgets repelling each other. In such a case, the operations of widget A and widget D remain independent—e.g., no information is shared.

The above arrangement, in certain embodiments, permits the efficient manipulation of applications. For example, the number of key strokes (or user input steps) performed by the users can be minimized, resulting in power savings. Furthermore, the use of state information permits enhanced coordination of applications; in this manner, the applications can optimize retrieval and use of network resources to avoid duplicative processes.

Figure 9A:
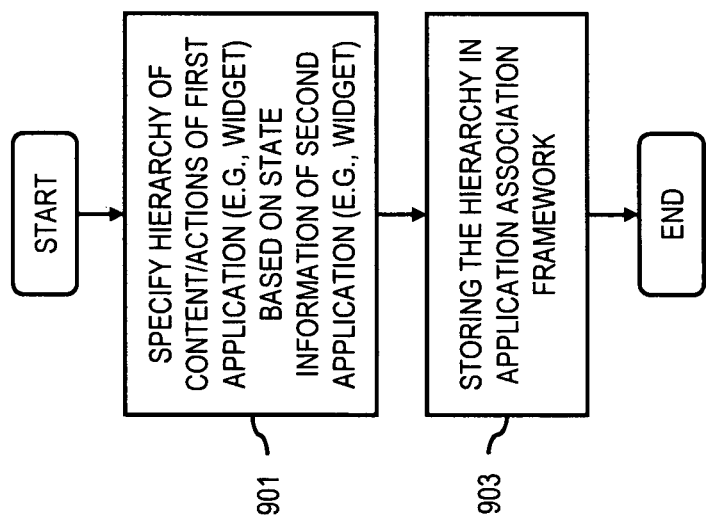
FIG. 9A is flowchart of a process for specifying a hierarchy of content and actions based on state information, according to one embodiment.

FIG. 9A is flowchart of a process for specifying a hierarchy of content and actions based on state information, according to one embodiment. By enabling the creation of a hierarchy, the system 100 provides for better coordination of compatible functions provided by a variety of distinct widgets or applications. For the purposes of illustration, the process of FIG. 9 is explained with respect to one or more relating applications or widgets with each other in the user interface (UI) environment. In step 901, the process specifies a hierarchy of content and/or actions that is to be presented on a widget 109a based on the state information of a widget 109b. In one embodiment, the hierarchy is a framework that associates specific content and actions available from a widget 109a with the state information of another widget 109b.

By specifying a hierarchy of content and actions, the process reduces the burden of discovering or finding content or actions that are of relevance to the user. Additionally, the hierarchy can make it more likely that the widget 109b can present content and actions that are useful to the user. In certain embodiments, the hierarchy is based on an importance factor associated with each category of content or actions. In other words, the importance factor is used to decide which actions and content are presented based on the state information of widget 109b. Moreover, the importance factor can be expressed as multiple tiers (e.g., tiers 1 through 3) to provide greater granularity in expressing relative importance. For example, in the hierarchy example described above, the order or priority assigned to each content or action item can represent the relative importance of each item. Viewing a photograph of the contact, for instance, is more important than viewing a photograph of the contact's home town.

It is contemplated that the hierarchy and corresponding importance factors may be predetermined by the content provider or may be dynamically determined based on user behavior. It is also contemplated that the available content or action may be associated with more than one widget. More specifically, individual contents or actions in the hierarchy may be provided respectively by different widgets, or a particular content item or action can be provided by a compatible combination of one or more widgets. In addition, the hierarchy can be based on the state information associated with one widget or with a combination of widgets.

After creating the hierarchy, the process stores the hierarchy in the association framework 103 for access by widgets active in the system 100. In this embodiment, a hierarchy can be created and stored for each potentially active widget or combination of widgets in the system 100.

Figure 9B:
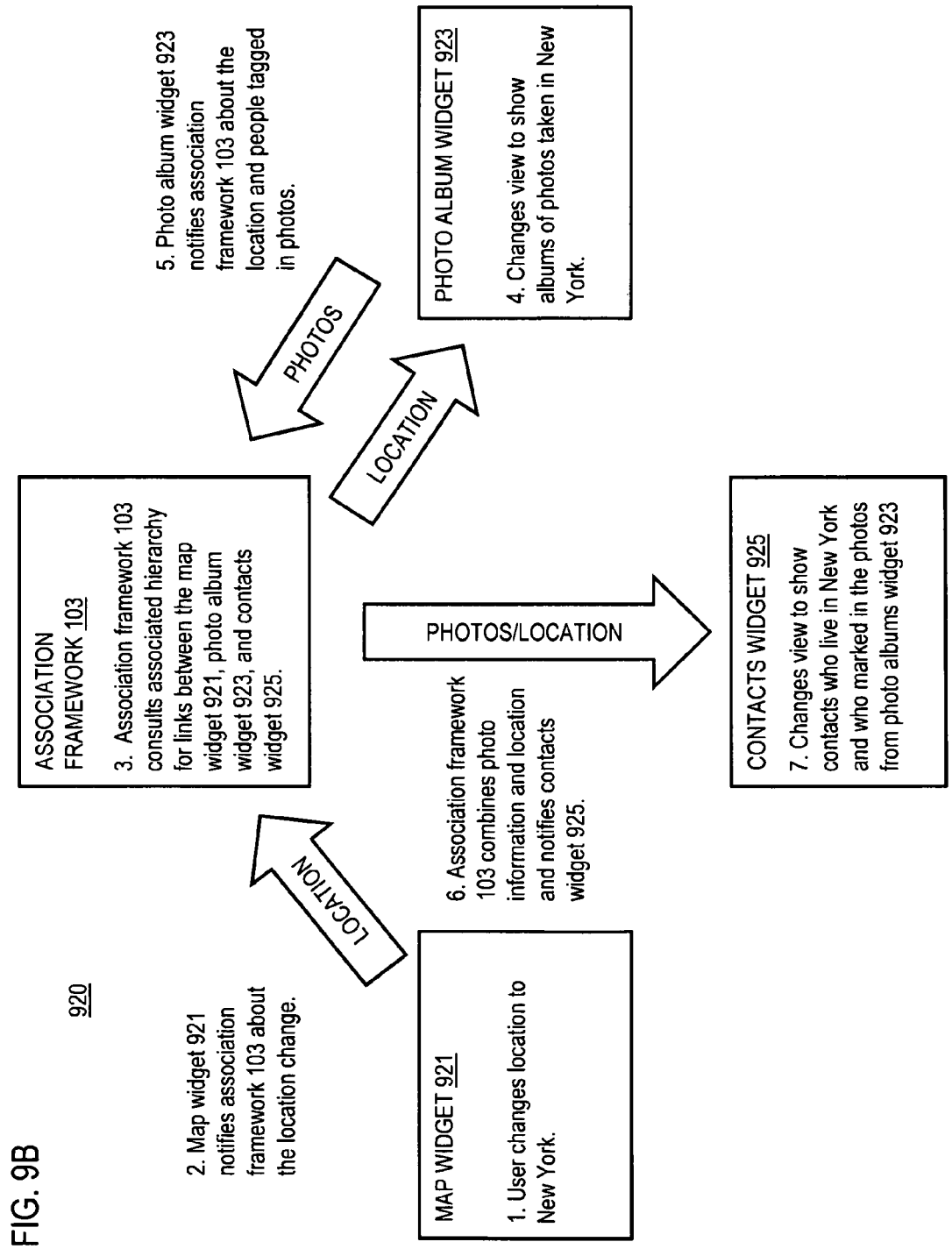
FIG. 9B is a diagram of a sample use case of the process of FIG. 9A, according to one embodiment.

FIG. 9B is a diagram of a sample use case of the process of FIG. 9A, according to one embodiment. As shown in FIG. 9B, there are three widgets running on, for instance, the UE 101: (1) a map widget 921 for displaying maps of various locations, (2) a photo album widget 923 for displaying photographs, and (3) a contacts widget 925 for displaying contact information. In this example, all three widgets 921-923 are linked via the association framework 103. In the first step of the sample use case 920, a user selects the map widget 921 and changes the location displayed by the widget 921 to New York. By way of example, the change in location represents a change in the state of the map widget 921. Accordingly, the map widget 921 notifies the association framework 103 of the location change.

On receipt of the notification, the association framework 103, for instance, consults the database 107 for a hierarchy corresponding to the map widget 921, the photo album widget 923, and the contacts widget 925 to determine the links between the widgets 921-923. In this example, the hierarchy specifies that the photo album widget 923 has a higher importance factor than the contacts widget 925. As a result, the association framework notifies the photo album widget 923 first that the location of the map widget 921 has changed to New York. In response, the photo album widget 923 changes its view (e.g., its state) to show photographs of or taken in the changed location (e.g., New York). This change in view represents a change in the state of the photo album widget 923 which, in turn, causes the photo album widget 923 to notify the association framework 103 of its changed state. For example, the notification includes the location and a list of the people tagged in the photographs corresponding to the location (e.g., New York).

The association framework 103 receives the notification from the photo album widget 923 and notifies the contacts widget 925 of both the combined changed state of the photo album widget 923 (e.g., list of tagged people) and of the map widget 921 (e.g., the New York location). The contacts widget 925 then, for instance, displays the contact information of the people tagged in the photographs displayed by the photo album widget 923 and as well as other contacts within a predefined proximity of the location displayed in the map widget 921.

By way of example, if the contacts widget 925 were assigned a higher importance factor than the photo album widget 923, the association framework 103 would have first notified the contacts widget 925. This notification would have caused the contacts widget 925 to display the user's contacts located in New York and to notify the association framework 103 of the displayed contacts. The association framework 103 then would have notified the photo album widget 923 to display photographs of the contacts presented in the contacts widget 925 as well as any photographs of New York in general.

Figure 10:
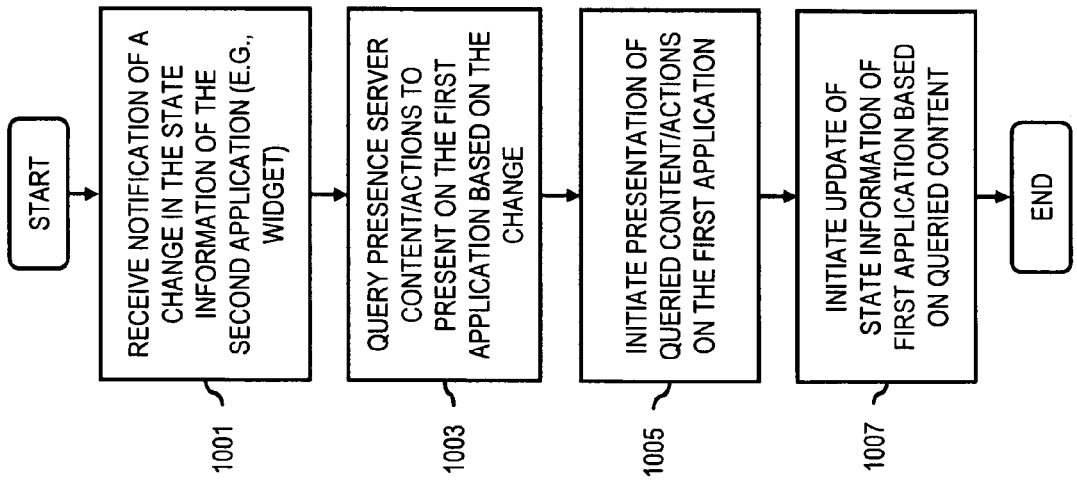
FIG. 10 is a flowchart of a process for presenting a hierarchy of content and actions based on state information, according to one embodiment.

FIG. 10 is a flowchart of a process for presenting a hierarchy of content and actions based on state information, according to one embodiment. As shown, in step 1001, a widget 109a receives a notification of a change in the state information of another widget 109b. By way of example, the notification may be sent directly from the widget 109b through for instance a common application programming interface (API) linking the widget 109b with widget 109a. In addition or alternatively, the widget 109b may report the change in its state information to, for instance, the association framework 103. The association framework 103 can then notify other widgets of the change. In either case, the widget 109b actively reports any change in state information to other active widgets.

On receiving the notification, each active widget or widgets, e.g., widget 109a, queries the association framework 103 to determine what specific content and/or action the widget should be presenting based on the state information of widget 109b (step 1003). For example, the query accesses the one or more stored hierarchies associated with the widgets and the widget 109b. In one embodiment, the query may return a predetermined number of the highest priority, e.g., high importance factor, content or actions for execution and/or presentation by the widgets. In other embodiments, the query may employ additional criteria, e.g., context, user behavior, content rating, etc., to determine the content or actions to display and/or execution. It is contemplated that the process may use any criteria or process for selecting content or actions to satisfy the query. The active widgets, e.g., widget 109a, then initiate presentation of the queried content and/or actions for user selection (step 1005).

In certain embodiments, the widgets displaying the queried content and/or actions may also update their respective state information to reflect the queried content being display (step 1007). As the widgets update their status information, they may also notify other related widgets of the state information change, thereby creating a cascading and recursive series of content and action updates so that the active widgets maximize the potential of displaying content or actions of relevance to the user.

Figure 11:
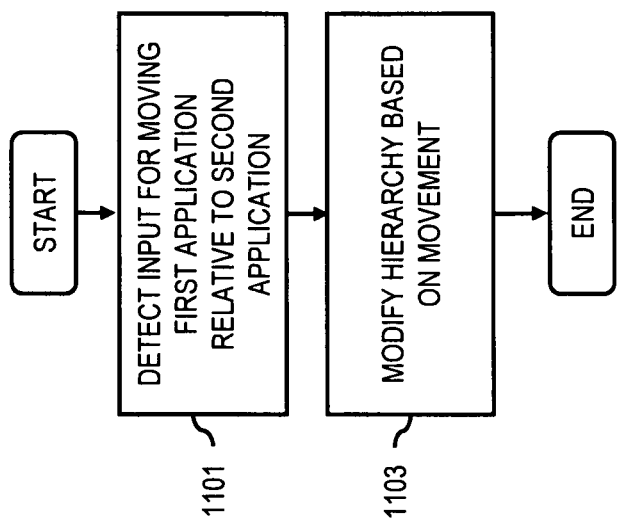
FIG. 11 is a flowchart of a process for modifying a hierarchy of content and actions based on state information, according to one embodiment.

FIG. 11 is a flowchart of a process for modifying a hierarchy of content and actions based on state information, according to one embodiment. The process of FIG. 11 assumes that a hierarchy has already been specified for at least a widget 109a and a widget 109b in the association framework 103. It is further assumed that the widgets 109a and 109b are presented in the same UI. In step 1101, the process detects input from, for instance, a user for moving the widget 109a relative to the widget 109b. In one embodiment, the spatial relationship between the widget 109a and widget 109b also affects the hierarchical relationship between the two widgets. Accordingly, movement of the widget 109a in relation to the widget 109b modifies the hierarchical relationship between the two widgets (step 1103). For example, moving the widget 109a to a position above the widget 109b can also modify the corresponding hierarchy to indicate that the content or actions of widget 109a are of higher priority than the content and actions of the widget 109b.

In certain embodiments, spatial positioning may also indicate which widget should be the active widget that dictates the content of other widgets. By way of example, the widget 109a is moved to a position above widget 109b. This movement indicates that the widget 109b should determine what content or actions to present based on the state information of the widget 109a. Accordingly, if the widget 109b is moved to a position above the widget 109a, the widget 109a would then present content or actions based on the state information of the widget 109b. It is also contemplated that the relative distances of the widgets can be an indicator of the relative importance of their respective content and actions.

Figure 12:
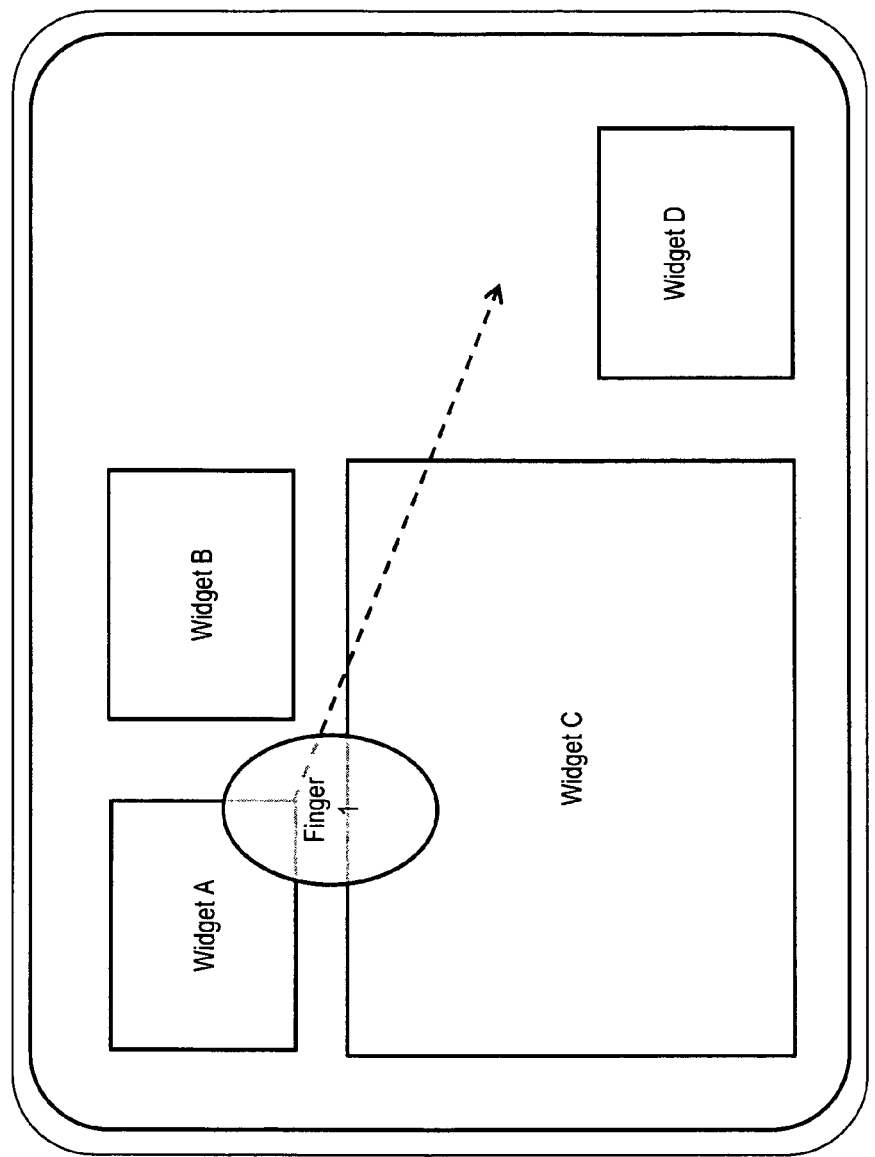
FIG. 12 is a diagram of a user interface for modifying a hierarchy of content and actions, according to one embodiment.

FIG. 12 is a diagram of a user interface for modifying a hierarchy of content and actions, according to one embodiment. FIG. 12 shows an interface 1200 illustrating the process of modifying the relative priorities of the content and actions associated with active widgets by moving a widget in relation to the other widgets as described with respect to FIG. 11. In this example, widgets A through D are active, and the user uses the UI to move widget A to a position above widget D but below widget B using Finger 1 to drag the widget A to its new position. The act of changing the relative positions of the widgets also changes the relative priorities of the content and actions corresponding to each widget in the corresponding hierarchy. In this case, moving widget A reduces the priority of the content and actions of widget A in relation to the content and actions of widget B to reflect widget A's new position below widget B.

The processes described herein for providing association of applications and exchange of state information for these applications may be implemented via software, hardware, e.g., general processor, Digital Signal Processing (DSP) chip, an Application Specific Integrated Circuit (ASIC), Field Programmable Gate Arrays (FPGAs), etc., firmware or a combination thereof. Such exemplary hardware for performing the described functions is detailed below.

Figure 13:
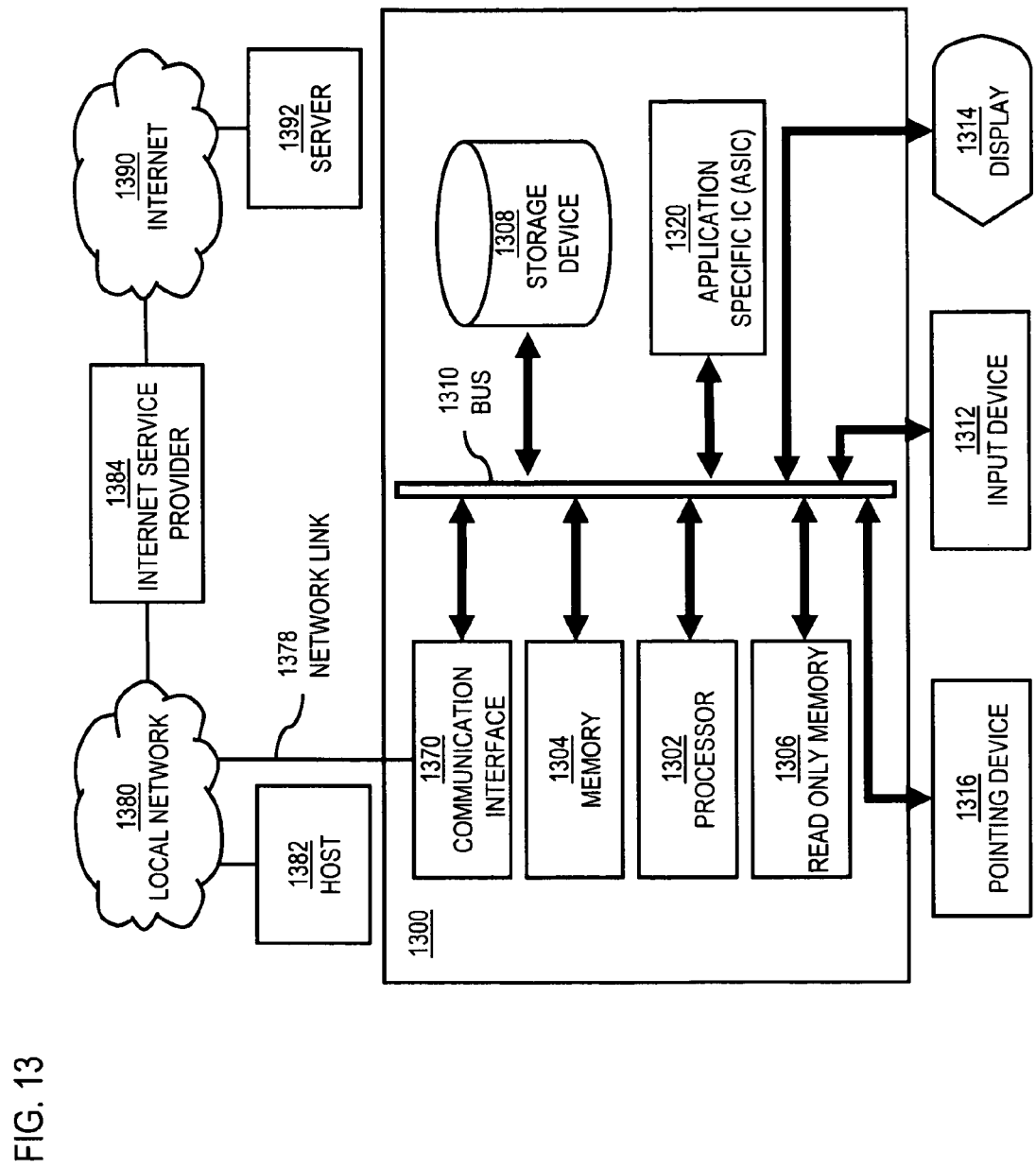
FIG. 13 is a diagram of hardware that can be used to implement an embodiment of the invention.

FIG. 13 illustrates a computer system 1300 upon which an embodiment of the invention may be implemented. Computer system 1300 is programmed to provide applications, e.g. widgets as described herein and includes a communication mechanism such as a bus 1310 for passing information between other internal and external components of the computer system 1300. Information (also called data) is represented as a physical expression of a measurable phenomenon, for example electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1310 includes one or more parallel conductors of information so that information is transferred quickly among devices coupled to the bus 1310. One or more processors 1302 for processing information are coupled with the bus 1310.

A processor 1302 performs a set of operations on information related to associating widgets as well as reporting and retrieval of state information. The set of operations include bringing information in from the bus 1310 and placing information on the bus 1310. The set of operations also include, for example, comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1302, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1300 also includes a memory 1304 coupled to bus 1310. The memory 1304, such as a random access memory (RAM) or other dynamic storage device, stores information including processor instructions for associating widgets. Dynamic memory allows information stored therein to be changed by the computer system 1300. RAM allows a unit of information stored at a location called a memory address to be stored and retrieved independently of information at neighboring addresses. The memory 1304 is also used by the processor 1302 to store temporary values during execution of processor instructions. The computer system 1300 also includes a read only memory (ROM) 1306 or other static storage device coupled to the bus 1310 for storing static information, including instructions, that is not changed by the computer system 1300. Some memory is composed of volatile storage that loses the information stored thereon when power is lost. Also coupled to bus 1310 is a non-volatile (persistent) storage device 1308, such as a magnetic disk, optical disk or flash card, for storing information, including instructions, that persists even when the computer system 1300 is turned off or otherwise loses power.

Information, including instructions for manipulating widgets, is provided to the bus 1310 for use by the processor from an external input device 1312, such as a keyboard containing alphanumeric keys operated by a human user, or a sensor. A sensor detects conditions in its vicinity and transforms those detections into physical expression compatible with the measurable phenomenon used to represent information in computer system 1300. Other external devices coupled to bus 1310, used primarily for interacting with humans, include a display device 1314, such as a cathode ray tube (CRT) or a liquid crystal display (LCD), or plasma screen or printer for presenting text or images, and a pointing device 1316, such as a mouse or a trackball or cursor direction keys, or motion sensor, for controlling a position of a small cursor image presented on the display 1314 and issuing commands associated with graphical elements presented on the display 1314. In some embodiments, for example, in embodiments in which the computer system 1300 performs all functions automatically without human input, one or more of external input device 1312, display device 1314 and pointing device 1316 is omitted.

In the illustrated embodiment, special purpose hardware, such as an application specific integrated circuit (ASIC) 1320, is coupled to bus 1310. The special purpose hardware is configured to perform operations not performed by processor 1302 quickly enough for special purposes. Examples of application specific ICs include graphics accelerator cards for generating images for display 1314, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1300 also includes one or more instances of a communications interface 1370 coupled to bus 1310. Communication interface 1370 provides a one-way or two-way communication coupling to a variety of external devices that operate with their own processors, such as printers, scanners and external disks. In general the coupling is with a network link 1378 that is connected to a local network 1380 to which a variety of external devices with their own processors are connected. For example, communication interface 1370 may be a parallel port or a serial port or a universal serial bus (USB) port on a personal computer. In some embodiments, communications interface 1370 is an integrated services digital network (ISDN) card or a digital subscriber line (DSL) card or a telephone modem that provides an information communication connection to a corresponding type of telephone line. In some embodiments, a communication interface 1370 is a cable modem that converts signals on bus 1310 into signals for a communication connection over a coaxial cable or into optical signals for a communication connection over a fiber optic cable. As another example, communications interface 1370 may be a local area network (LAN) card to provide a data communication connection to a compatible LAN, such as Ethernet. Wireless links may also be implemented. For wireless links, the communications interface 1370 sends or receives or both sends and receives electrical, acoustic or electromagnetic signals, including infrared and optical signals, that carry information streams, such as digital data. For example, in wireless handheld devices, such as mobile telephones like cell phones, the communications interface 1370 includes a radio band electromagnetic transmitter and receiver called a radio transceiver. In certain embodiments, the communications interface 1370 enables connection to the communication network 105 for querying and retrieving state information of widgets.

The term computer-readable medium is used herein to refer to any medium that participates in providing information to processor 1302, including instructions for execution. Such a medium may take many forms, including, but not limited to, non-volatile media, volatile media and transmission media. Non-volatile media include, for example, optical or magnetic disks, such as storage device 1308. Volatile media include, for example, dynamic memory 1304. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Figure 14:
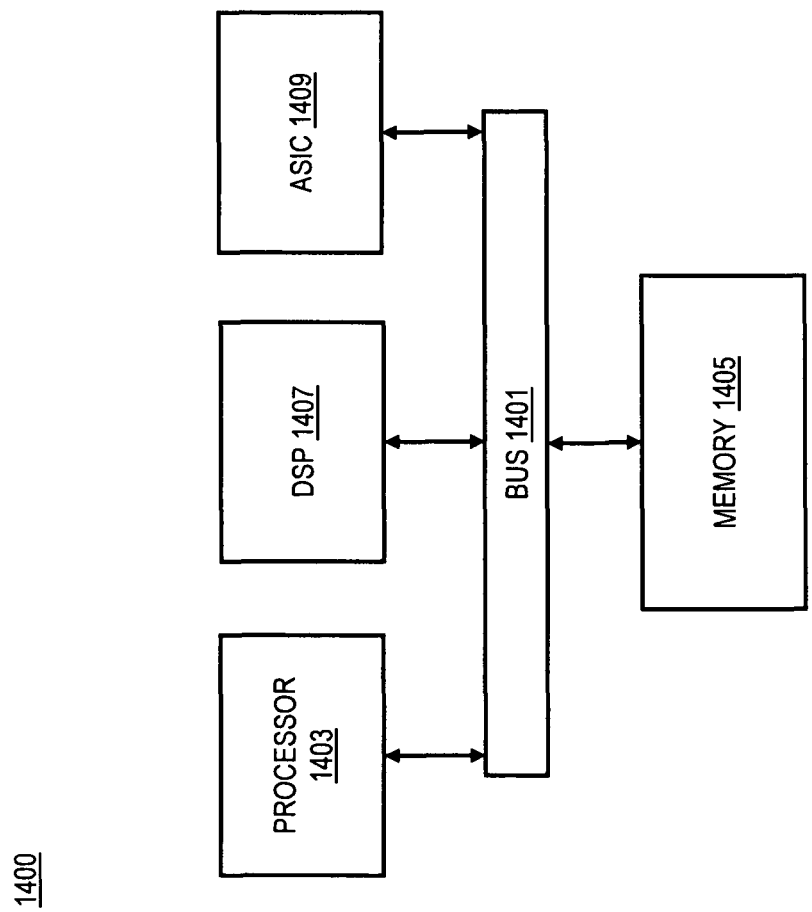
FIG. 14 is a diagram of a chip set that can be used to implement an embodiment of the invention.

FIG. 14 illustrates a chip set 1400 upon which an embodiment of the invention may be implemented. Chip set 1400 is programmed to associate widgets and/or obtain state information as described herein and includes, for instance, the processor and memory components described with respect to FIG. 14 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, the chip set 1400 includes a communication mechanism such as a bus 1401 for passing information among the components of the chip set 1400. A processor 1403 has connectivity to the bus 1401 to execute instructions and process information stored in, for example, a memory 1405. The processor 1403 may include one or more processing cores with each core configured to perform independently. A multi-core processor enables multiprocessing within a single physical package. Examples of a multi-core processor include two, four, eight, or greater numbers of processing cores. Alternatively or in addition, the processor 1403 may include one or more microprocessors configured in tandem via the bus 1401 to enable independent execution of instructions, pipelining, and multithreading. The processor 1403 may also be accompanied with one or more specialized components to perform certain processing functions and tasks such as one or more digital signal processors (DSP) 1407, or one or more application-specific integrated circuits (ASIC) 1409. A DSP 1407 typically is configured to process real-world signals (e.g., sound) in real time independently of the processor 1403. Similarly, an ASIC 1409 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1403 and accompanying components have connectivity to the memory 1405 via the bus 1401. The memory 1405 includes both dynamic memory (e.g., RAM, magnetic disk, writable optical disk, etc.) and static memory (e.g., ROM, CD-ROM, etc.) for storing executable instructions that when executed perform the inventive steps described herein to provide association of widgets and utilization of state information. The memory 1405 also stores the data associated with or generated by the execution of the inventive steps.

Figure 15:
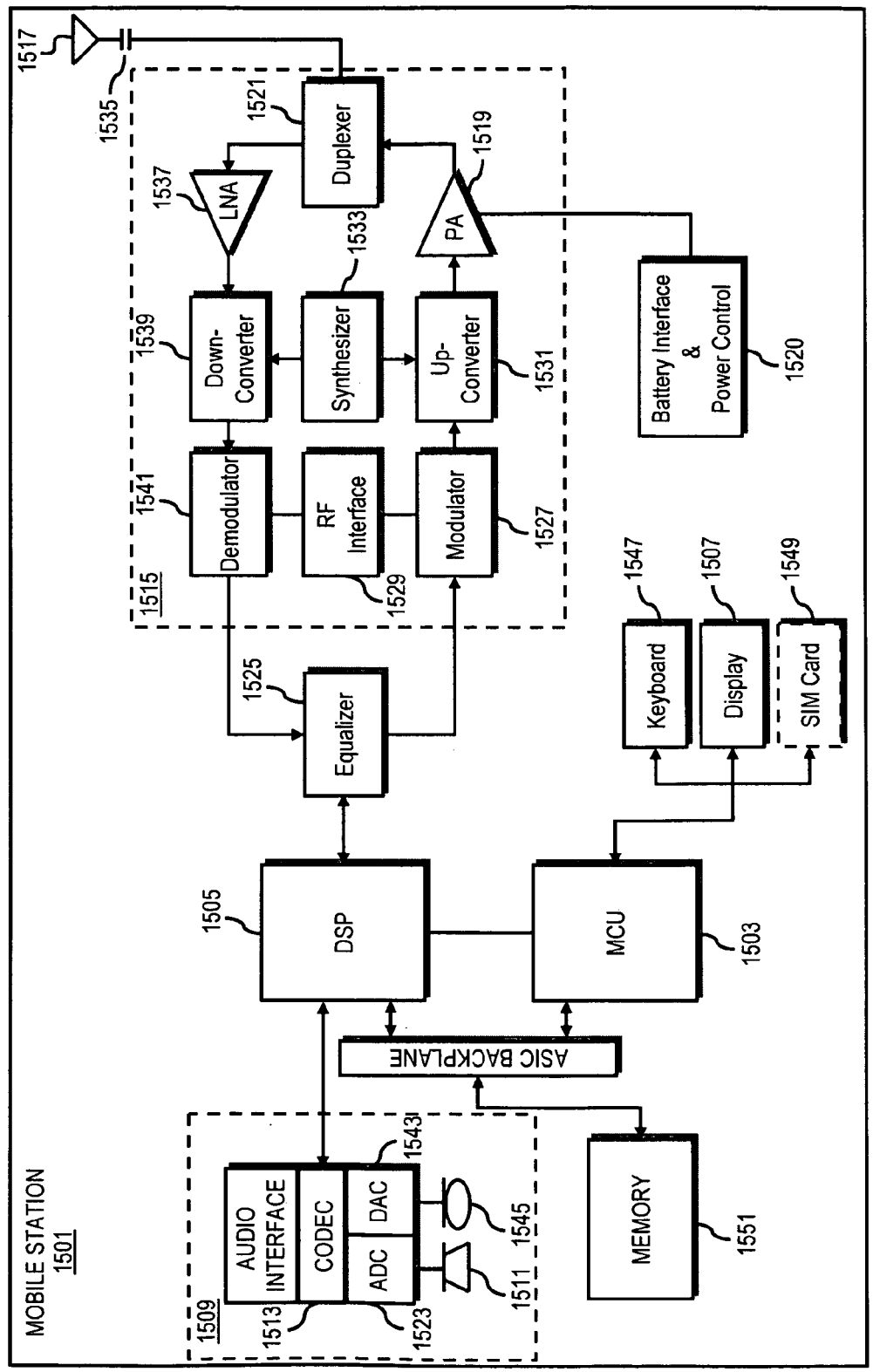
FIG. 15 is a diagram of a mobile station (e.g., handset) that can be used to implement an embodiment of the invention.

FIG. 15 is a diagram of exemplary components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1503, a Digital Signal Processor (DSP) 1505, and a receiver/transmitter unit including a microphone gain control unit and a speaker gain control unit. A main display unit 1507 provides a display to the user in support of various applications and mobile station functions, such as widgets. An audio function circuitry 1509 includes a microphone 1511 and microphone amplifier that amplifies the speech signal output from the microphone 1511. The amplified speech signal output from the microphone 1511 is fed to a coder/decoder (CODEC) 1513.

A radio section 1515 amplifies power and converts frequency in order to communicate with a base station, which is included in a mobile communication system, via antenna 1517. The power amplifier (PA) 1519 and the transmitter/modulation circuitry are operationally responsive to the MCU 1503, with an output from the PA 1519 coupled to the duplexer 1521 or circulator or antenna switch, as known in the art. The PA 1519 also couples to a battery interface and power control unit 1520.

In use, a user of mobile station 1501 speaks into the microphone 1511 and his or her voice along with any detected background noise is converted into an analog voltage. The analog voltage is then converted into a digital signal through the Analog to Digital Converter (ADC) 1523. The control unit 1503 routes the digital signal into the DSP 1505 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1525 for compensation of any frequency-dependent impairments that occur during transmission though the air such as phase and amplitude distortion. After equalizing the bit stream, the modulator 1527 combines the signal with a RF signal generated in the RF interface 1529. The modulator 1527 generates a sine wave by way of frequency or phase modulation. In order to prepare the signal for transmission, an up-converter 1531 combines the sine wave output from the modulator 1527 with another sine wave generated by a synthesizer 1533 to achieve the desired frequency of transmission. The signal is then sent through a PA 1519 to increase the signal to an appropriate power level. In practical systems, the PA 1519 acts as a variable gain amplifier whose gain is controlled by the DSP 1505 from information received from a network base station. The signal is then filtered within the duplexer 1521 and optionally sent to an antenna coupler 1535 to match impedances to provide maximum power transfer. Finally, the signal is transmitted via antenna 1517 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1501 are received via antenna 1517 and immediately amplified by a low noise amplifier (LNA) 1537. A down-converter 1539 lowers the carrier frequency while the demodulator 1541 strips away the RF leaving only a digital bit stream. The signal then goes through the equalizer 1525 and is processed by the DSP 1505. A Digital to Analog Converter (DAC) 1543 converts the signal and the resulting output is transmitted to the user through the speaker 1545, all under control of a Main Control Unit (MCU) 1503—which can be implemented as a Central Processing Unit (CPU) (not shown).

The MCU 1503 receives various signals including input signals from the keyboard 1547. The keyboard 1547 and/or the MCU 1503 in combination with other user input components (e.g., the microphone 1511) comprise a user interface circuitry for managing user input. The MCU 1503 runs a user interface software facilitate user control of at least come functions of the mobile station 1501 according to, for example, an multi-touch user interface. The MCU 1503 also delivers a display command and a switch command to the display 1507 and to the speech output switching controller, respectively. Further, the MCU 1503 exchanges information with the DSP 1505 and can access an optionally incorporated SIM card 1549 and a memory 1551. In addition, the MCU 1503 executes various control functions required of the station. The DSP 1505 may, depending upon the implementation, perform any of a variety of conventional digital processing functions on the voice signals. Additionally, DSP 1505 determines the background noise level of the local environment from the signals detected by microphone 1511 and sets the gain of microphone 1511 to a level selected to compensate for the natural tendency of the user of the mobile station 1501.

The CODEC 1513 includes the ADC 1523 and DAC 1543. The memory 1551 stores various data including call incoming tone data and is capable of storing other data including music data received via, e.g., the global Internet. The software module could reside in RAM memory, flash memory, registers, or any other form of writable storage medium known in the art. The memory device 1551 may be, but not limited to, a single memory, CD, DVD, ROM, RAM, EEPROM, optical storage, or any other non-volatile storage medium capable of storing digital data.

An optionally incorporated SIM card 1549 carries, for instance, important information, such as the cellular phone number, the carrier supplying service, subscription details, and security information. The SIM card 1549 serves to identify the mobile station 1501 on a radio network. The card 1549 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   specifying a hierarchy of content, actions, or both to be presented, executed, or both by a first application based on state information of a second application;
   storing the hierarchy in an association framework;
   in response to a multi-touch input that moves a first icon of the first application towards a second icon of the second application on a user interface, initiating a display of either an attractive indication or a repulsive indication with respect to a predetermined action on the user interface, wherein the attractive indication or the repulsive indication is determined based, at least in part, on the state information;
   after the display of either the attractive indication or the repulsive indication, reversing the first icon and the second icon back to respective positions on the user interface prior to the multi-touch input;
   after the display of the attractive indication and the reversing, initiating a prompt for updating information from the first application into the second application on the user interface; and
   in response to a user response to the prompt, updating the information from the first application into the second application.

2. The method of claim 1, further comprising:
   receiving a notification of a change in the state information of the second application;
   querying the association framework for the content, actions, or both to be presented, executed, or both by the first application based on the change; and
   initiating presentation, execution, or both of the queried content, actions, or both by the first application.

3. The method of claim 1, wherein the first application resides at a user device, and the second application resides at another user device.

4. The method of claim 2, further comprising:
   wherein the notification is transmitted by the association framework or the second application, and wherein the attractive indication is expressed in a percentage of attractiveness, or the repulsive indication is expressed in a percentage of repulsiveness.

5. The method of claim 4, further comprising:
   after the updating of the information from the first application into the second application, sending updates of the state information of the first application into the second application in a cascading and recursive series, wherein the updates of the state information include updates of the queried content, actions, or both associated with the first application.

6. The method of claim 1, wherein the hierarchy is specified according to an importance factor defined between the content, actions, or both of the first application and the state information of the second application, the importance factor is expressed with respect to multiple tiers of relative importance, and wherein the repulsive indication includes a display on the user interface showing that the first icon and the second icon as repelling away from each other.

7. The method of claim 1, wherein each of the applications includes a widget, and wherein the attractive indication includes a display on the user interface showing that the first icon and the second icon as being drawn to each other.

8. An apparatus comprising:
   at least one processor; and
   at least one memory including computer program code,
   the at least one memory and the computer program code configured to, with the at least one processor, cause the apparatus to perform at least the following,
   specify a hierarchy of content, actions, or both to be presented, executed, or both by a first application based on state information of a second application;
   store the hierarchy in an association framework;
   in response to a multi-touch input that moves a first icon of the first application towards a second icon of the second application on a user interface, initiate a display of either an attractive indication or a repulsive indication with respect to a predetermined action on the user interface, wherein the attractive indication or the repulsive indication is determined based, at least in part, on the state information;
   after the display of either the attractive indication or the repulsive indication, reverse the first icon and the second icon back to respective positions on the user interface prior to the multi-touch input;
   after the display of the attractive indication and the reversing, initiate a prompt for updating information from the first application into the second application on the user interface; and
   in response to a user response to the prompt, update the information from the first application into the second application.

9. The apparatus of claim 8, wherein the apparatus is further caused to:
   receive a notification of a change in the state information of the second application;
   query association framework for the content, actions, or both to be presented, executed, or both by the first application based on the change; and
   initiate presentation, execution, or both of the queried content, actions, or both by the first application.

10. The apparatus of claim 9, wherein the apparatus is further caused to:
    initiate update of the state information of the first application based on the queried content, actions, or both.

11. The apparatus of claim 9, wherein the notification is transmitted by the association framework or the second application.

12. The apparatus of claim 8, wherein the apparatus is further caused to:
  detect an input signal for indicating a movement of a user interface representation of the first application relative to a user interface representation of the second application; and
  modify the hierarchy based on the input signal.

13. The apparatus of claim 8, wherein the hierarchy is specified according to an importance factor defined between the content, actions, or both of the first application and the state information of the second application, and wherein the importance factor is expressed with respect to multiple tiers of relative importance.

14. The apparatus of claim 8, wherein each of the applications includes a widget.

15. The apparatus of claim 7, wherein the apparatus is a mobile phone further comprising:
  user interface circuitry and user interface software configured to facilitate user control of at least some functions of the mobile phone through use of a display and configured to respond to user input; and
  a touch screen display and display circuitry configured to display at least a portion of a user interface of the mobile phone, the display and display circuitry configured to facilitate user control of at least some functions of the mobile phone and the simultaneous selection of the widgets.

16. A non-transitory computer-readable storage medium carrying one or more sequences of one or more instructions which, when executed by one or more processors, cause the one or more processors to at least perform the following steps:
  specifying a hierarchy of content, actions, or both to be presented, executed, or both by a first application based on state information of a second application;
  storing the hierarchy in an association framework;
  in response to a multi-touch input that moves a first icon of the first application towards a second icon of the second application on a user interface, initiating a display of either an attractive indication or a repulsive indication with respect to a predetermined action on the user interface, wherein the attractive indication or the repulsive indication is determined based, at least in part, on the state information;
  after the display of either the attractive indication or the repulsive indication, reversing the first icon and the second icon back to respective positions on the user interface prior to the multi-touch input;
  after the display of the attractive indication and the reversing, initiating a prompt for updating information from the first application into the second application on the user interface; and
  in response to a user response to the prompt, updating the information from the first application into the second application.

17. The non-transitory computer-readable storage medium of claim 16, wherein the apparatus is caused to further perform:
  detecting a change in the state information of the second application, wherein the second application reports the change to the association framework;
  querying the association framework for the content, actions, or both to be presented, executed, or both by the first application based on the state information of the second application;
  initiating presentation, execution, or both of the queried content, actions, or both by the first application; and
  initiating update of the state information of the first application based on the queried content, actions, or both.

18. The non-transitory computer-readable storage medium of claim 16, wherein the apparatus is caused to further perform:
  detecting an input signal for indicating a movement of a user interface representation of the first application relative to a user interface representation of the second application; and
  modifying the hierarchy based on the input signal.

19. The non-transitory computer-readable storage medium of claim 16, wherein the hierarchy is specified according to an importance factor defined between the content, actions, or both of the first application and the state information of the second application, and wherein the importance factor is expressed with respect to multiple tiers of relative importance.

20. The non-transitory computer-readable storage medium of claim 16, wherein each of the applications includes a widget.

* * * * *

UNITED STATES PATENT AND TRADEMARK OFFICE
CERTIFICATE OF CORRECTION

PATENT NO.         : 9,933,914 B2  
APPLICATION NO.    : 12/497977  
DATED              : April 3, 2018  
INVENTOR(S)        : Mikko Antero Nurmi et al.

Page 1 of 1

It is certified that error appears in the above-identified patent and that said Letters Patent is hereby corrected as shown below:

Column 19, Line 16, Claim 15 reads:  
"The apparatus of claim 7, wherein the apparatus is a"

Should read:  
"The apparatus of claim 8, wherein the apparatus is a"

Signed and Sealed this  
Seventh Day of August, 2018

Andrei Iancu  
*Director of the United States Patent and Trademark Office*